T. J. TRAPP.
Hose-Couplings.

No. 139,632.  Patented June 3, 1873.

Witnesses:
G. Markys
A. W. Carr

Inventor:
Thomas J. Trapp
per
Attorneys.

UNITED STATES PATENT OFFICE.

THOMAS J. TRAPP, OF WILLIAMSPORT, PENNSYLVANIA.

IMPROVEMENT IN HOSE-COUPLINGS.

Specification forming part of Letters Patent No. 139,632, dated June 3, 1873; application filed April 5, 1873.

*To all whom it may concern:*

Be it known that I, THOMAS J. TRAPP, of Williamsport, in the county of Lycoming and State of Pennsylvania, have invented a new and Improved Coupling for Elastic Hose; and I do hereby declare the following to be a full, clear, and exact description of the same, reference being had to the accompanying drawing, forming part of this specification, in which—

Figure 2:
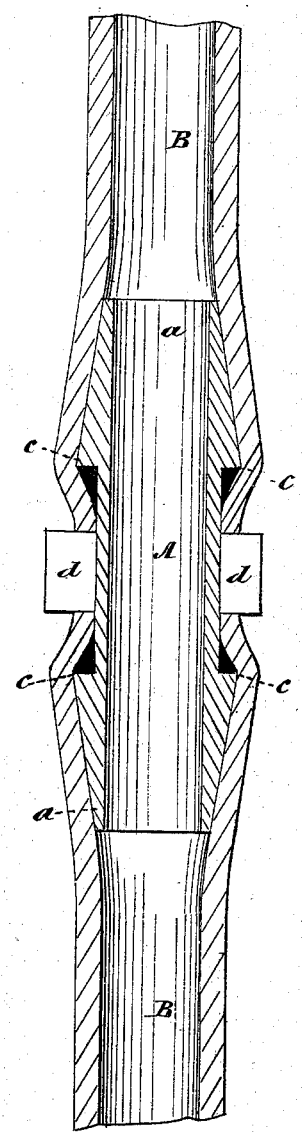
Figure 1:
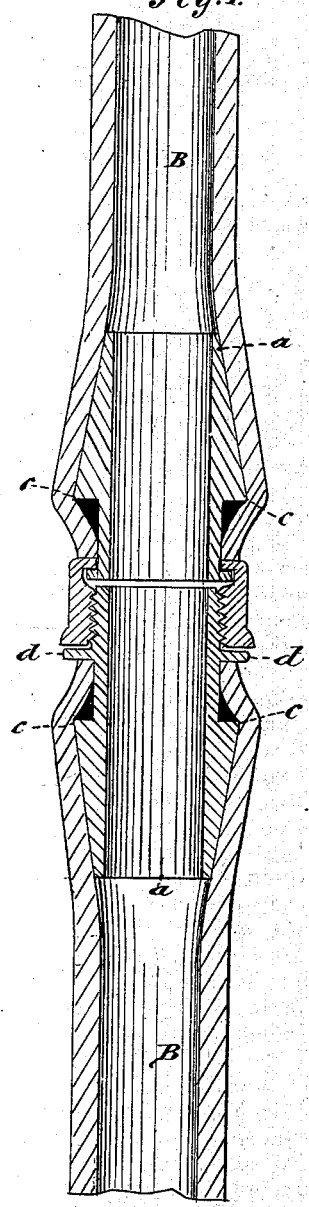

Figure 1 is a central longitudinal section of a jointed or ordinary screw-coupling, showing my improvements. Fig. 2 is a similar section of a coupling-tube unprovided with a joint.

The object of my invention is to provide a device for connecting elastic hose where severed accidentally or otherwise, or for attaching the same to nozzles, &c., which may be quickly and conveniently applied, and will enable the hose to effectually resist all attempts to disconnect or remove it by subjection to such tensile strain as it is capable of enduring without serious injury or complete rupture. To this end, I provide a coupling-tube, A, with a conical or tapered end, $a$, terminating at its base or inner end in a right-angled annular shoulder, forming thus a sharp annular projection, $c$. I have found that this construction conduces to the firmest connection between the hose and metal tube, while it also enables them to be coupled with ease and rapidity. To apply the tube to a hose, B, the tapered end $a$ is forced or driven into it until the parts are in the position indicated in the drawing, or until the hose is forced sufficiently far over the projection $c$ to allow its extreme end portion to contract around the body of the tube A. This forms a tight joint, and the projection $c$ presents such an obstacle to the removal of the hose that a knife or other mechanical means must be employed to disconnect them. The circumferential rib or flange $d$ of the tube forms a stop for the hose against which its square-cut end abuts, thus preventing the hose being forced too far over the conical end $a$, and also protecting the end of the hose from injury. In Fig. 2 I have shown the rib $d$ arranged equidistant between the projections $c$ $c$ so as to subserve the purpose just indicated, and also form a surface to which the hand may be applied when the tube is to be inserted in the end of a hose. This device is designed to be used on occasions where a jointed coupling, such as shown in Fig. 1, is unnecessary, or for any reason undesirable. It will be understood that the tapered ends, as well as the body of the tube A, should in all cases somewhat exceed the normal diameter of the hose.

Having thus described my invention, what I claim as new, and desire to secure by Letters Patent, is—

1. In couplings for elastic hydraulic hose, the tube A provided with a tapered or conical end terminating in a right-angled shoulder, as shown and described.

2. The circumferential rib $d$, in combination with the tube A, and a projection, $c$, for engaging with the elastic hose, as specified.

THOMAS J. TRAPP.

Witnesses:
A. W. HART,
SOLON C. KEMON.